(12) United States Patent
Kaneyoshi et al.

(10) Patent No.: US 6,596,397 B2
(45) Date of Patent: Jul. 22, 2003

(54) THERMAL SPRAY PARTICLES AND SPRAYED COMPONENTS

(75) Inventors: Masami Kaneyoshi, Takefu (JP); Takao Maeda, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/114,999

(22) Filed: Apr. 4, 2002

(65) Prior Publication Data

US 2002/0177014 A1 Nov. 28, 2002

(30) Foreign Application Priority Data

Apr. 6, 2001 (JP) .......................................... 2001-109163

(51) Int. Cl.[7] .............................. C01F 17/00; B32B 5/16
(52) U.S. Cl. ........................ 428/402; 423/263; 423/592; 428/328; 427/453
(58) Field of Search ................................ 428/328, 402; 423/592, 263; 427/453

(56) References Cited

U.S. PATENT DOCUMENTS

| | | | | |
|---|---|---|---|---|
| 5,013,534 A | * | 5/1991 | Dissaux et al. | ............. 423/263 |
| 5,332,558 A | * | 7/1994 | Kaneyoshi et al. | ......... 423/21.1 |
| 5,470,503 A | * | 11/1995 | Braconnier | ........... 252/301.4 P |
| 5,644,037 A | * | 7/1997 | Kaneyoshi et al. | ........... 534/16 |
| 5,688,480 A | * | 11/1997 | Mohri et al. | ................. 423/263 |
| 5,746,944 A | * | 5/1998 | Braconnier | ........... 252/301.4 P |
| 5,895,604 A | * | 4/1999 | Funabashi et al. | ...... 252/301.44 |
| 6,238,593 B1 | * | 5/2001 | Huguenin et al. | ........ 252/301.4 |
| 6,303,091 B1 | * | 10/2001 | Mohri et al. | ................. 423/263 |

FOREIGN PATENT DOCUMENTS

| | | |
|---|---|---|
| EP | 1 167 565 A2 | 2/2002 |
| JP | 05-286716 | 2/1993 |
| JP | 10-087325 A | 7/1998 |

* cited by examiner

Primary Examiner—H. Thi Le
(74) Attorney, Agent, or Firm—Birch, Stewart, Kolasch & Birch, LLP

(57) ABSTRACT

Rare earth-containing compound particles of polyhedral shape having an average particle diameter of 3–100 $\mu$m, a dispersion index of up to 0.5, and an aspect ratio of up to 2 can be thermally sprayed to form an adherent coating, despite the high melting point of the rare earth-containing compound. A sprayed component having the particles spray coated on a substrate surface is also provided.

6 Claims, 2 Drawing Sheets

THERMAL SPRAY PARTICLES AND SPRAYED COMPONENTS

This invention relates to rare earth-containing compound particles for thermal spraying, and a sprayed component. More particularly, it relates to rare earth-containing compound particles which can be plasma or otherwise sprayed to surfaces of metal or ceramic substrates to form highly adherent, smooth and highly pure coatings, and a sprayed component having a coating of the rare earth-containing compound particles.

BACKGROUND OF THE INVENTION

It is a common practice in the art to thermally spray metal oxide particles to metal, ceramic and other substrates to form a coating thereof for imparting heat resistance, abrasion resistance and corrosion resistance.

The particle powders suitable for thermal spray coatings typically include (1) a fused and ground powder obtained by melting a starting material in an electric furnace, cooling the melt for solidification, and pulverizing the solid in a grinding machine into particles, followed by classification for particle size adjustment; (2) a sintered and ground powder obtained by firing a raw material, and pulverizing the sintered material in a grinding machine into particles, followed by classification for particle size adjustment; and (3) a granulated powder obtained by adding a raw material powder to an organic binder to form a slurry, atomizing the slurry through a spray drying granulator, and firing the particles, optionally followed by classification for particle size adjustment. Although components using alumina, silica or the like have been developed as the sprayed component, it is difficult to produce particle-free dense components.

The thermal spraying particles have to meet the requirements that (i) they can be consistently fed at a quantitative rate to the plasma or flame during spraying, (ii) their shape remains undisrupted during the feed and spraying, and (iii) they are fully melted during spraying. These requirements are quantitatively expressed by more than ten physical parameters of particles.

Since the thermal spraying particles are fed to the spray gun through a narrow flowpath such as a transportation tube, whether they can be consistently fed at a quantitative rate without sticking is largely affected by the powder physical properties and fluidity thereof.

However, the fused or sintered and ground powder resulting from method (1) or (2), though having sufficient strength, has irregular shapes and a broad particle size distribution so that the friction between particles during transportation entails formation of finer particles. Additionally, the powder has a large angle of repose and poor fluidity so that the transportation tube or spray gun can be clogged, preventing continuous thermal spraying operation.

Developed as a solution to these problems of the ground powders was the granulated powder obtained by method (3), that is, having the advantage of smooth fluidity due to the spherical or nearly spherical shape of particles. The strength of the granulated powder tends to vary over a wide range because it depends on the particle size distribution of a raw material powder and the firing conditions. Particles with a low strength will readily collapse during the feed to the spray gun. As the process to make the granulated powder is complicated and composed of number of steps, it becomes difficult to prevent introduction of impurities such as Fe.

In the thermal spraying of metal oxide particles, the particles must be completely melted in the flame or plasma in order to form a sprayed coating having a high bond strength. In the event where granulated powder is prepared using a spray drying granulator, however, an average particle diameter of less than 20 $\mu$m is difficult to accomplish. In the event of the fused or sintered and ground powder resulting from method (1) or (2), a spray material having a small average particle diameter is obtainable owing to grinding in a mill, which can cause contamination. When particles are prepared in a conventional way, it is difficult to avoid the introduction of impurities at a level of several ten ppm.

As mentioned above, the fused/ground powder, sintered/ground powder and granulated powder discussed above individually have advantages and disadvantages and are not necessarily optimum as the spray particles. Additionally, the powders of these three types all suffer contamination from the grinding, granulating and classifying steps, which is deemed problematic from the high purity standpoint.

Specifically, the fused/ground powder, sintered/ground powder or granulated powder having passed the grinding or granulating and classifying steps contains impurities such as iron group elements, alkali metal elements and alkaline earth metal elements, typically in a content of more than 20 ppm, calculated as oxide. A sprayed component having a coating obtained by spraying any of these powders is susceptible to corrosion at impurity sites in the coating, failing to provide satisfactory durability.

SUMMARY OF THE INVENTION

An object of the invention is to provide thermal spray rare earth-containing compound particles of high purity which can be thermally sprayed to form an adherent coating despite the high melting point of the rare earth-containing compound. Another object of the invention is to provide a sprayed component having the particles spray coated on a substrate surface.

The invention addresses rare earth-containing compound particles for thermal spraying. We have found that by controlling the average particle diameter, dispersion index and aspect ratio to specific ranges, conforming the particle shape to a polyhedron, and optionally, controlling the surface area, bulk density, crystallite size and impurity content to specific ranges, the rare earth-containing compound particles are improved in fluidity and given so high density and strength that the particles are completely melted rather than being collapsed during thermal spraying. A coating obtained by thermally spraying the particles is smooth and pure as compared with conventional sprayed coatings, and offers better adhesion and corrosion resistance.

In a first aspect, the invention provides rare earth-containing compound particles for thermal spraying which are of polyhedral shape and have an average particle diameter of 3 to 100 $\mu$m, a dispersion index of up to 0.5, and an aspect ratio of up to 2. Preferably the particles have a specific surface area of up to 8.0 $m^2/g$ and/or a bulk density which is at least 0.3 times the true density. Preferably, crystallites have a size of at least 25 nm. The content of each of iron group elements, alkali metal elements and alkaline earth metal elements is preferably up to 5 ppm, calculated as oxide.

In a second aspect, the invention provides a sprayed component comprising a substrate having a surface and a coating of the rare earth-containing compound particles thermally sprayed on the substrate surface.

DESCRIPTION OF THE PREFERRED EMBODIMENTS

Figure 1:
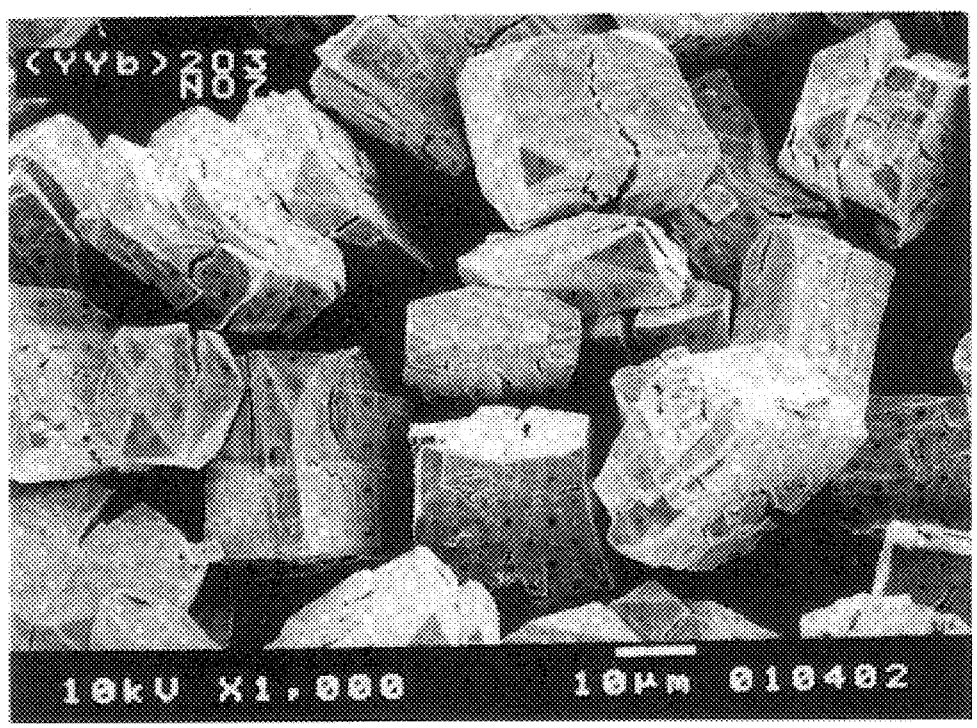
FIGS. 1 and 2 are photomicrographs (×1000 and ×100) of the rare earth-containing compound particles obtained in Example 1, respectively.

In the invention, particles for thermal spraying are formed of a rare earth-containing compound. As used herein, the term "rare earth" encompasses rare earth elements of Group 3A in the Periodic Table inclusive of yttrium (Y), that is, includes especially Y, Eu, Gd, Tb, Dy, Ho, Er, Tm, Yb, Lu, etc. These heavy rare earth elements may be used alone or in admixture. The rare earth-containing compounds include oxides, halides (e.g., fluorides, oxyfluorides and chlorides) and other compounds which contain rare earth elements. Of these, the oxides are preferred because they are vulnerable to sintering. In the following description, reference is made to rare earth-containing oxide although the same discussion applies to other rare earth-containing compounds.

It is understood that complex oxides in the form of rare earth-containing oxides combined with at least one metal selected from Al, Si, Zr, In, etc. are also useful for the inventive particles.

The rare earth-containing oxide particles should have an average particle diameter of 3 to 100 μm since they have a high melting point and a low heat conductivity. If the average particle diameter is less than 3 μm, such fine particles may evaporate or scatter in the plasma flame during spraying, resulting in a corresponding loss. If the average particle diameter exceeds 100 μm, some particles may remain unmelted (not completely melted) in the plasma flame during the spraying step and thus form non-fused particles, resulting in a low bond strength. The preferred average particle diameter is 5 to 50 μm, and especially 7 to 40 μm.

It is noted that particles have a particle size distribution as measured by a laser diffraction analyzer in which a particle diameter D90, D50 and D10 corresponds to 90%, 50% and 10% by volume accumulation, respectively. As used herein, the "average particle diameter" is a diameter D50 corresponding to 50% by volume accumulation.

The rare earth-containing oxide particles have a polyhedral shape and a narrow particle size distribution. The term "polyhedral" as used herein means regular polyhedrons inclusive of cubes, and polyhedrons close thereto. Needle and plate shapes are excluded from the polyhedron. A spherical shape substantially free of angular sides is also excluded.

Specifically, the particles should have a dispersion index of up to 0.5 and an aspect ratio of up to 2. The dispersion index is defined as:

Dispersion index=$(D90-D10)/(D90+D10)$.

A dispersion index in excess of 0.5 indicates a broad particle size distribution and leads to a disturbance to flow so that the nozzle to which the powder is fed may be clogged. Preferably the dispersion index is up to 0.4.

As used herein, the "aspect ratio" is defined as the ratio of length to breadth of a particle, as determined from a SEM photomicrograph. An aspect ratio of more than 2 indicates that particles have a shape dissimilar from regular polyhedron, leading to disturbed flow. The lower limit of the aspect ratio is, though not critical, preferably close to 1.

In a preferred embodiment, the thermal spray particles of rare earth-containing oxide have a specific surface area of up to 8.0 $m^2/g$, more preferably 0.1 to 4.0 $m^2/g$, and most preferably 0.1 to 1.0 $m^2/g$, as measured by the BET method. A surface area in excess of 8.0 $m^2/g$ may lead to more surface asperities and hence, deteriorated surface smoothness and poor fluidity.

In a further preferred embodiment, the particles have a bulk density which is at least 0.3 times, more preferably at least 0.4 times, and most preferably at least 0.5 times the true density. A bulk density which is less than 0.3 times the true density indicates that particles may be less dense and hence, weak enough to collapse upon spraying. The upper limit bulk density is, of course, equal to the true density.

It is generally believed that single crystal particles are most dense, and that polycrystalline particles are more dense as single crystal grains constituting each particle have a larger grain size. The single crystal grains constituting each particle are generally known as crystallites. In the thermal spray particles of rare earth-containing oxide according to the invention, the crystallites preferably have a size of at least 25 nm, and more preferably at least 50 nm. When the crystallite size is less than 25 nm, polycrystalline particles with such a small single crystal grain size are not regarded dense in many cases. Note that the crystallite size is determined by effecting x-ray diffraction analysis and calculating according to Wilson method. According to Wilson method, the crystallite size is normalized to fall in the range of 0 to 100 nm, regardless of the actual size of single crystal grains.

When it is desired that a coating formed on a component by spraying the particles impart satisfactory corrosion resistance to the coated component. The thermal spray particles of rare earth-containing oxide should preferably have a limited impurity content. Specifically, the content of each of iron group elements (Fe, Ni, Co, etc.), alkali metal elements (Na, K, etc.) and alkaline earth metal elements (Mg, Ca, etc.) in the particles should preferably be up to 5 ppm, more preferably up to 3 ppm, calculated as oxide. The lower the content of these metal elements, the better are the results. In most cases, the lower limit is about 0.1 ppm. It is noted that the content of iron group elements, alkali metal elements or alkaline earth metal elements is measured by inductively coupled plasma (ICP) emission spectrometry after acidolysis of the particles.

The thermal spray particles of rare earth-containing oxide are preferably prepared by the following process although the invention is not limited thereto.

First, an aqueous rare earth solution (i.e., an aqueous solution of a water-soluble rare earth salt such as chloride, nitrate or sulfate) is mixed with an aqueous oxalic acid solution. More particularly, with stirring, a rare earth salt solution having a free acid concentration of at least 0.2 mol/liter and a rare earth element concentration of 0.1 to 1.0 mol/liter is mixed with an aqueous 1–30 wt % oxalic acid solution in an amount of 2 to 2.5 mol per mol of rare earth elements and aqueous ammonia in an amount of 2 to 4 mol per mol of oxalic acid. The order of addition of these solutions is not critical.

After mixing, the oxalate double salt precipitates out. The precipitate and the reaction solution is held at 30 to 100° C., preferably 50 to 100° C. for 1 to 8 hr. Then the precipitate is separated from the reaction solution by filtration, washed with water. It is also allowed that an ample volume of hot water is added to the reaction solution, the resulting mixture is held in the above mentioned range of temperature and for the above mentioned time. The precipitate may be first separated from the reaction solution by filtration, then dispersed in hot water and heated as above, and filtered again. It is dried if necessary and fired in an inert gas atmosphere or air at a temperature of 700 to 1,700° C., preferably 1,200 to 1,600° C., for about 1 to 6 hours, preferably about 2 to 4 hours. By way of pyrolysis of the oxalate to oxide, crystal growth within oxide particles, and densification of oxide particles, rare earth-containing oxide particles of polyhedral shape for thermal spraying are obtained.

The above process does not involve a granulating step and/or a grinding step and thus minimizes the introduction of contaminants from auxiliary materials and the process equipment. As a consequence, particles of high purity are readily produced in which the content of each of iron group elements (Fe, Ni, Co, etc.), alkali metal elements (Na, K, etc.) and alkaline earth metal elements (Mg, Ca, etc.) is up to 5 ppm, calculated as oxide, and no other impurities are present.

As described above, the spray particles of the invention are free fluidic, can be consistently and continuously fed through a transportation tube or the like without clogging thereof, have a high density and strength enough to withstand collapse in the plasma flame during spraying. In addition, the average particle diameter is so small that the particles can be completely melted in the plasma flame during spraying. The high purity and polyhedral shape of particles ensure that a coating resulting from spraying thereof have a high bond strength and that the coating have a reduced surface roughness, typically of up to 60 μm.

In another embodiment, the invention provides a thermally sprayed component comprising a substrate and a coating of the rare earth-containing compound particles thermally sprayed to a surface of the substrate.

The material of the substrate is usually selected from metals, ceramics and glass, though not limited thereto. Examples of metal materials include Al, Fe, Si, Cr, Zn, Zr, Ni and alloys thereof. Examples of ceramics include metallic nitride, metallic carbide and metallic oxide such as alumina, zirconia, aluminum nitride, silicon nitride and silicon carbide. Examples of glasses include quartz glass.

The coating on the substrate surface preferably has a thickness of 50 to 500 μm, more preferably 150 to 300 μm. A coating thickness of less than 50 μm leads to a likelihood that the sprayed component, on use as a corrosion resistant component, must be replaced by a new one just after faint corrosion. A coating of more than 500 μm thick is too thick and has a risk that delamination occurs within it.

The coating preferably has a surface roughness of up to 60 μm, more preferably up to 40 μm, though the preferred surface roughness varies with a particular application of the sprayed component. A surface roughness of more than 60 μm has a likelihood of dust generation during the service of a sprayed component and presents a larger plasma contact area which may degrade corrosion resistance and allow fines to generate with the progress of corrosion. Namely, a coating having a surface roughness of up to 60 μm ensures good corrosion resistance sufficient to preclude corrosion even in a corrosive gas atmosphere. Then the sprayed component is advantageously used as a corrosion resistant component.

The spray coated component of the invention is obtainable by plasma spraying or vacuum plasma spraying the rare earth-containing compound particles to the substrate surface to form a coating thereon. The plasma gas used herein is usually selected from nitrogen/hydrogen, argon/hydrogen, argon/helium and argon/nitrogen, though not limited thereto. The spraying conditions are not critical and may be determined as appropriate in accordance with the type of substrate and rare earth-containing compound particles used and the desired application of the spray coated component.

In the spray coated component, the coating should preferably have a limited content of each of iron group elements, alkali metal elements and alkaline earth metal elements which is up to 5 ppm, calculated as oxide. This level is accomplished using spray particles of rare earth-containing compound having a metal element content of up to 5 ppm as described above. Differently stated, when coating is formed using spray particles of rare earth-containing compound having iron group elements, alkali metal elements and alkaline earth metal elements introduced each at a content of more than 5 ppm, the iron group elements, alkali metal elements and alkaline earth metal elements are incorporated in the coating in the same content as in the starting spray particles. The present invention eliminates this problem using rare earth-containing compound particles having a limited impurity content.

The sprayed component in which the coating has a metal element content of each up to 5 ppm (calculated as oxide) causes least contamination and can be used in equipment where a high purity is crucial. More specifically, the sprayed component is best suited for use in liquid crystal manufacturing equipment and semiconductor manufacturing equipment, to name a few.

EXAMPLE

Examples of the invention are given below by way of illustration and not by way of limitation.

Example 1

Oxalic acid ($H_2C_2O_4 \cdot 2H_2O$), 794.3 g, was dissolved in 9.27 $dm^3$ of deionized water, to which 900 $cm^3$ of 28% aqueous ammonia was added. With stirring, the solution was heated at 75° C.

Separately, 4.29 $dm^3$ of a mixed solution of ytterbium nitrate and yttrium nitrate (Yb concentration 0.28 mol/$dm^3$, Y concentration 0.42 mol/$dm^3$, free acid concentration 1.40 mol/$dm^3$) was prepared at room temperature. With stirring, this solution was poured to the oxalic acid solution, which had been prepared and heated above, over about one minute. The solution mixture was further stirred for 2 hrs while keeping at a temperature of 72 to 75° C.

Thereafter, the precipitate formed was collected on a Buchner funnel and washed with 15 dM3 of deionized water. The precipitate thus collected was air dried for 2 hours. The precipitate or oxalate was placed in a porcelain crucible and fired in air at 900° C. for 2 hours, whereby it was pyrolyzed into a complex oxide of ytterbium oxide and yttrium oxide. It was placed in an alumina crucible and fired in air at 1,500° C. for 2 hours, obtaining particles which was ready for thermal spraying.

Figure 2:
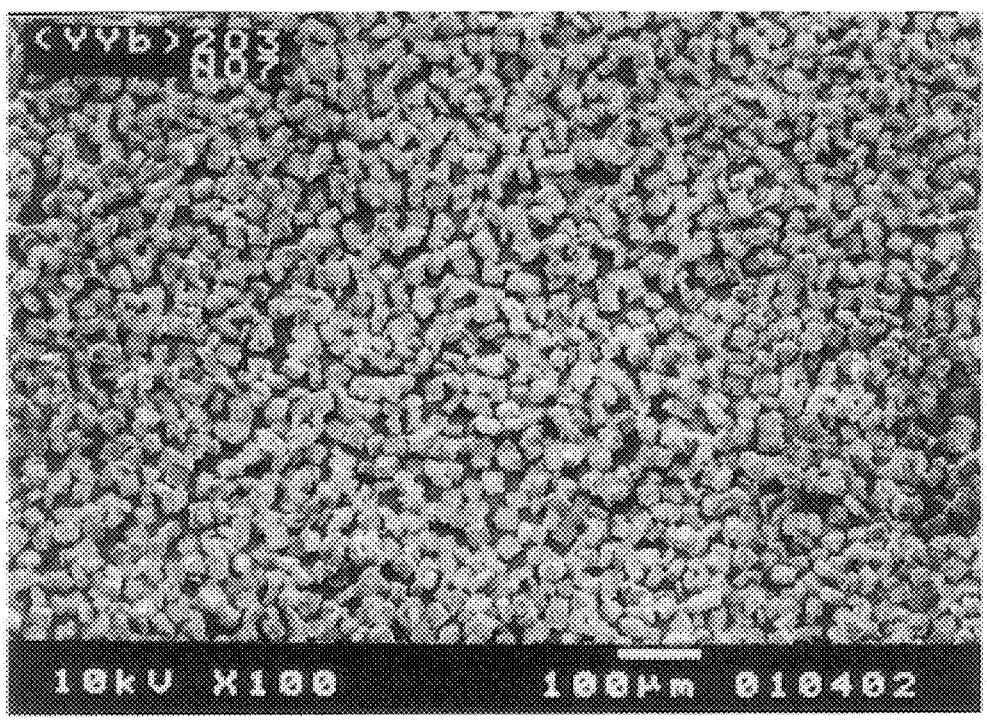

The particles were measured for physical properties including particle diameter and crystallite size, with the results shown in Table 1. FIGS. 1 and 2 are photomicrographs (×1000 and ×100) of the particles. It is seen that the particles have an angular shape (regular polyhedral shape).

Using an argon/hydrogen gas plasma, the particles were sprayed to an aluminum alloy substrate to form a coating of 250 μm thick thereon. The coating was examined for surface roughness and impurity content, with the results shown in Table 2. It is noted that surface roughness Ra was measured according to JIS B0601.

Example 2

Particles for thermal spraying were prepared as in Example 1 except that a ytterbium nitrate solution (Yb concentration 0.70 mol/$dm^3$, free acid concentration 1.40 mol/$dm^3$) was used instead of the mixed solution of ytterbium nitrate and yttrium nitrate. The particles were measured for physical properties including particle diameter and crystallite size, with the results shown in Table 1.

Using an argon/hydrogen gas plasma, the particles were sprayed to an aluminum alloy substrate to form a coating of 210 μm thick thereon. The coating was examined for surface roughness and impurity content, with the results shown in Table 2.

Like Example 1, the particles obtained in Example 2 had an angular shape (regular polyhedral shape), though photomicrograph is omitted.

Comparative Example 1

In 15 liters of deionized water was dissolved 15 g of polyvinyl alcohol (PVA). 5 kg of ytterbium oxide having an average particle diameter of 1.2 μm was dispersed therein to form a slurry. Using a spray granulator, the slurry was spray dried to form granules. They were fired at 1,600° C. for 2 hours, obtaining particles for thermal spraying. Physical properties including particle diameter and crystallite size of the particles are shown in Table 1. The particles were not angular.

Using an argon/hydrogen gas, the particles were vacuum plasma sprayed to an aluminum alloy substrate to form a coating of 250 μm thick thereon. The coating was examined for surface roughness and impurity content, with the results shown in Table 2.

TABLE 1

Particles

|  | Example 1 | Example 2 | Comparative Example 1 |
|---|---|---|---|
| Average particle diameter (μm) | 28 | 23 | 24 |
| Dispersion index | 0.25 | 0.24 | 0.52 |
| Aspect ratio | 1.3 | 1.4 | 1.1 |
| Bulk density (g/cm$^3$) | 3.12 | 3.98 | 2.46 |
| True density (g/cm$^3$) | 6.58 | 9.18 | 9.18 |
| Specific surface area (m$^2$/g) | 0.3 | 0.15 | 1.2 |
| Crystallite size (nm) | 60 | 50 | 20 |
| CaO (ppm) | <1 | <1 | 5 |
| Fe$_2$O$_3$ (ppm) | <1 | <1 | 8 |
| Na$_2$O (ppm) | <1 | <1 | 11 |

TABLE 2

Coating

|  | Example 1 | Example 2 | Comparative Example 1 |
|---|---|---|---|
| Surface roughness (μm) | 37 | 32 | 73 |
| CaO (ppm) | <1 | <1 | 5 |
| Fe$_2$O$_3$ (ppm) | <1 | <1 | 8 |
| Na$_2$O (ppm) | <1 | <1 | 11 |

As seen from Table 1, the rare earth-containing oxide particles obtained in Examples 1 and 2 have an average particle diameter in the range of 3 to 100 μm, a low dispersion index of less than 0.4, a high purity as demonstrated by very low impurity contents of CaO, Fe$_2$O$_3$ and Na$_2$O, and a bulk density of at least 0.3 times the true density. In contrast, the rare earth-containing oxide particles obtained in Comparative Example 1 have a high dispersion index of 0.52, that is more than 0.5, high impurity contents of Fe$_2$O$_3$, Na$_2$O, etc. and a bulk density of less than 0.3 times the true density.

The coatings of sprayed rare earth-containing oxide particles in Examples 1 and 2 have very low impurity contents of CaO, Fe$_2$O$_3$ and Na$_2$O, as seen from Table 2 and are thus suitable in the application where a high purity is required, for example, in liquid crystal manufacturing equipment and semiconductor manufacturing equipment. The sprayed component having a coating with a reduced surface roughness is useful as a corrosion resistant component for operation in a corrosive gas atmosphere such as halide gas plasma.

In contrast, the coating of sprayed particles in Comparative Example 1 has the impurity contents of iron group element, alkali metal element and alkaline earth metal element unchanged from the spray particles and a high surface roughness of 73 μm.

The rare earth-containing compound particles for thermal spraying having an average particle diameter of 3 to 100 μm, a dispersion index of up to 0.5, an aspect ratio of up to 2, and a polyhedral shape according to the invention can be consistently and continuously fed to the spray nozzle and completely melted in the plasma flame during the spraying to form a coating on a substrate so that the bond strength between the coating and the substrate may be increased.

Japanese Patent Application No. 2001-109163 is incorporated herein by reference.

Reasonable modifications and variations are possible from the foregoing disclosure without departing from either the spirit or scope of the present invention as defined by the claims.

What is claimed is:

1. Rare earth-containing compound particles for thermal spraying which are rare earth oxide or mixed rare earth oxide particles of polyhedral shape and having an average particle diameter of 3 to 100 μm, a dispersion index of up to 0.5, and an aspect ratio of up to 2.

2. The rare earth-containing compound particles of claim 1 having a specific surface area of up to 8.0 m$^2$/g.

3. The rare earth-containing compound particles of claim 1 having a bulk density which is at least 0.3 times the true density.

4. The rare earth-containing compound particles of claim 1 wherein crystallites have a size of at least 25 nm.

5. The rare earth-containing compound particles of claim 1 wherein the content of each of iron group elements, alkali metal elements and alkaline earth metal elements is up to 5 ppm, calculated as oxide.

6. A sprayed component comprising a substrate having a surface and a coating of the rare earth-containing compound particles of claim 1 thermally sprayed on the substrate surface.

* * * * *